United States Patent [19]

Liston

[11] 3,900,289

[45] Aug. 19, 1975

[54] APPARATUS AND METHOD FOR FILLING A COMPARTMENT

[75] Inventor: Max D. Liston, Irvine, Calif.

[73] Assignee: Abbott Laboratories, North Chicago, Ill.

[22] Filed: May 3, 1973

[21] Appl. No.: 357,066

Related U.S. Application Data

[62] Division of Ser. No. 133,081, April 12, 1971, Pat. No. 3,748,044.

[52] U.S. Cl. ............ 23/230 R; 23/230 B; 23/253 R; 23/259; 73/423 A
[51] Int. Cl.² .................... G01N 1/14; G01N 33/16
[58] Field of Search .. 23/230 R, 259, 230 B, 253 R; 73/423 A; 141/130

[56] References Cited
UNITED STATES PATENTS

| | | |
|---|---|---|
| 3,252,330 | 5/1966 | Kling............................. 23/253 R X |
| 3,437,447 | 4/1969 | Harmon.......................... 23/253 R |
| 3,449,959 | 6/1969 | Grimshaw.................. 23/253 R UX |
| 3,617,222 | 11/1971 | Matte.............................. 23/230 R |
| 3,768,526 | 10/1973 | Sanz et al...................... 23/253 R X |

Primary Examiner—Joseph Scovronek
Assistant Examiner—Michael S. Marcus
Attorney, Agent, or Firm—Molinare, Allegretti, Newitt & Witcoff

[57] ABSTRACT

Improved components, such as a specimen dispenser for filling a compartment, are disclosed in the specification. The specimen dispenser fills a compartment to a predetermined level with an aqueous solution taken from a reservoir of the aqueous solution. The dispenser includes a hollow probe nozzle which is used to draw solution from the reservoir and is moved to the vicinity of the compartment in order to deposit a predetermined amount of the solution into the compartment.

6 Claims, 16 Drawing Figures

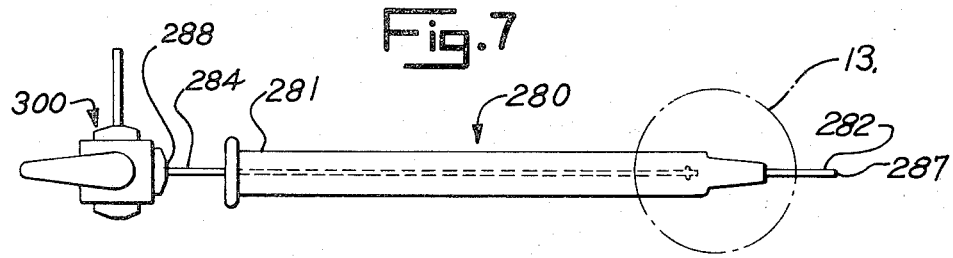
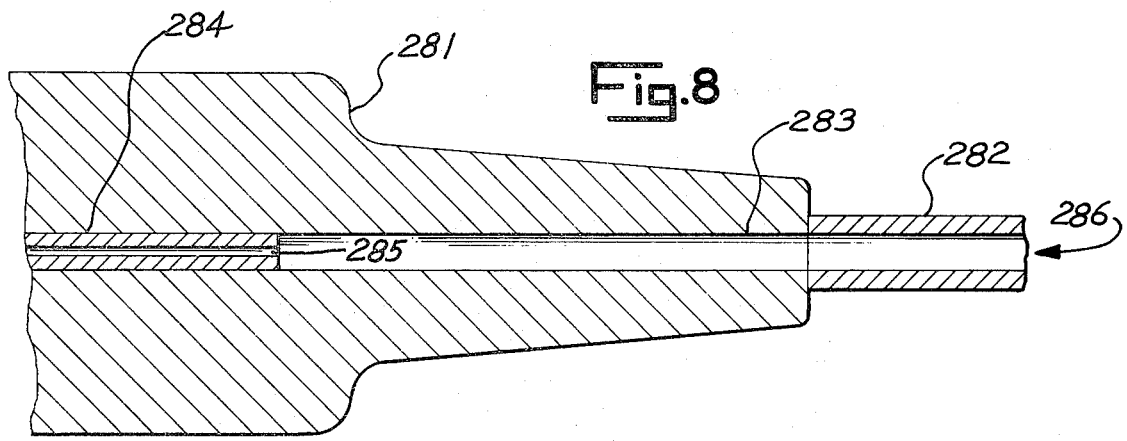

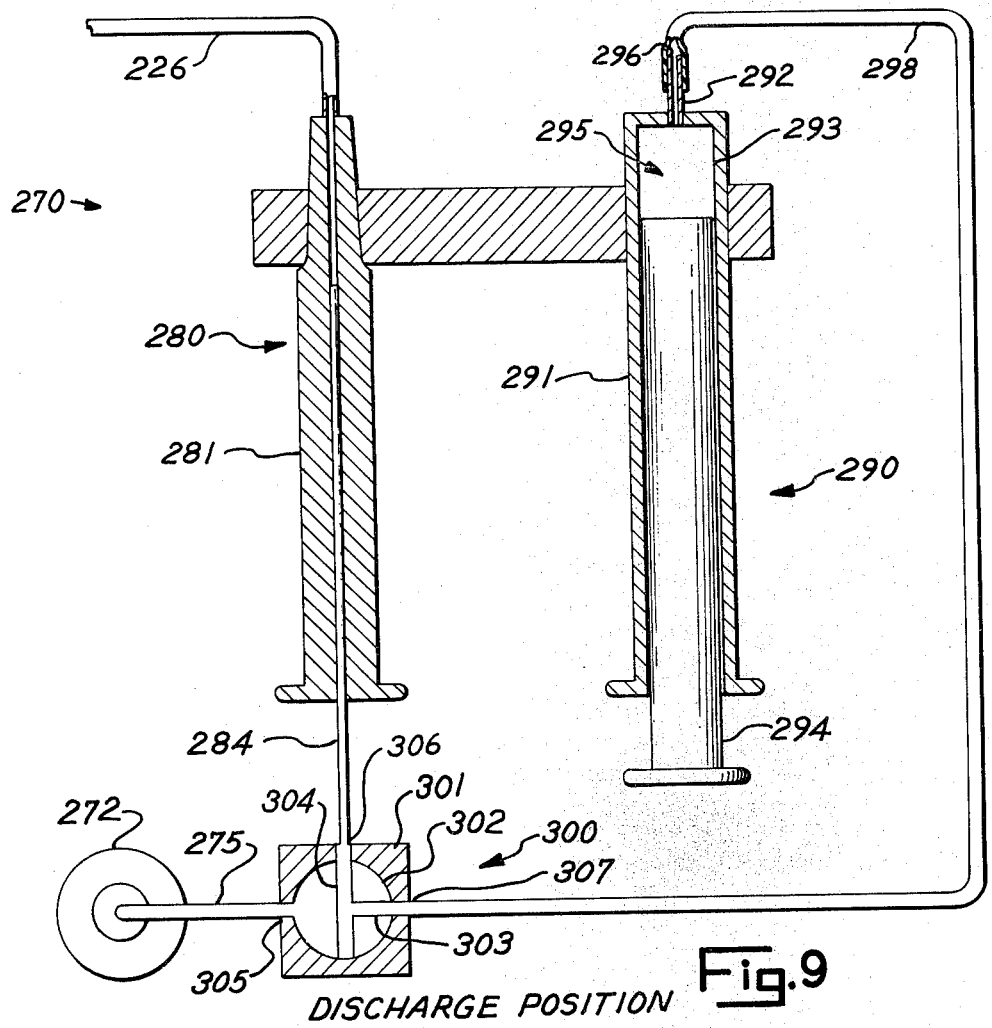
Fig.9 DISCHARGE POSITION
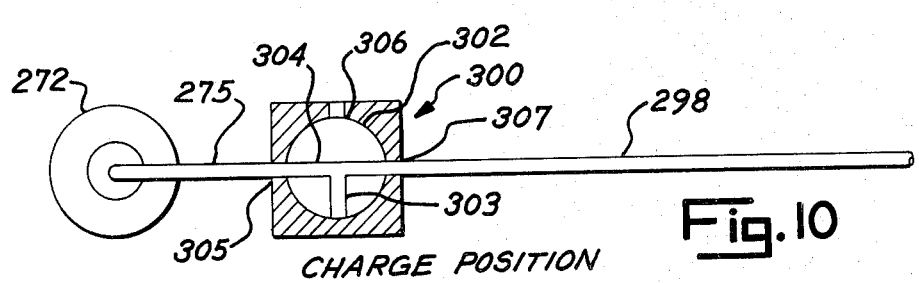
Fig.10 CHARGE POSITION

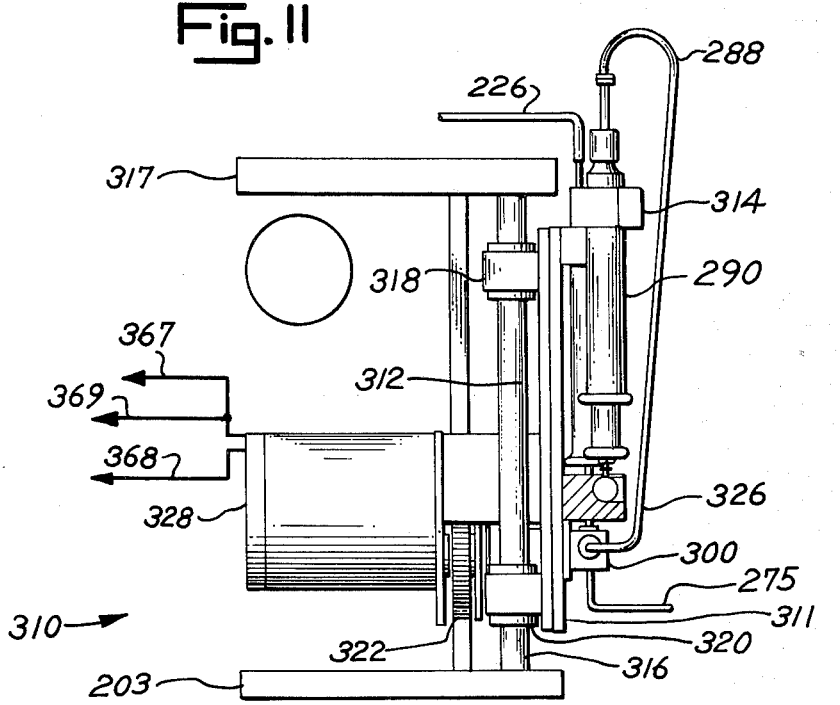
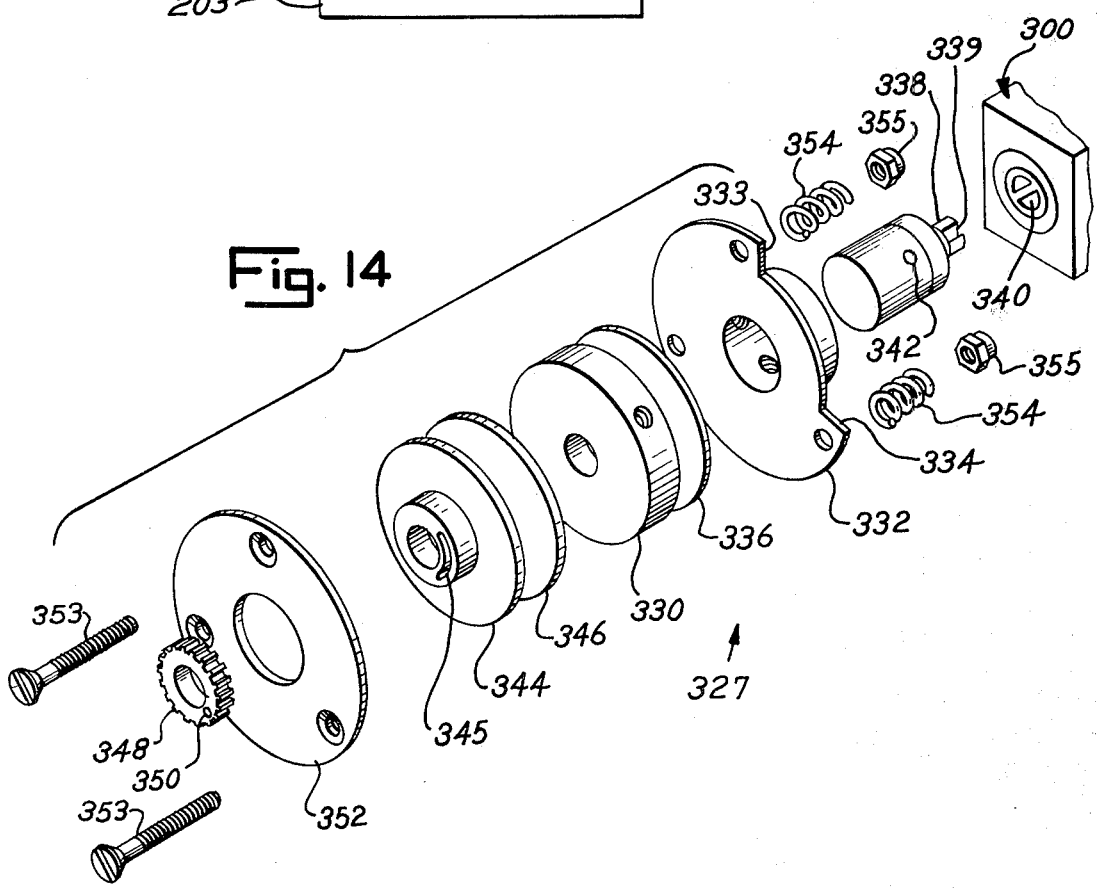

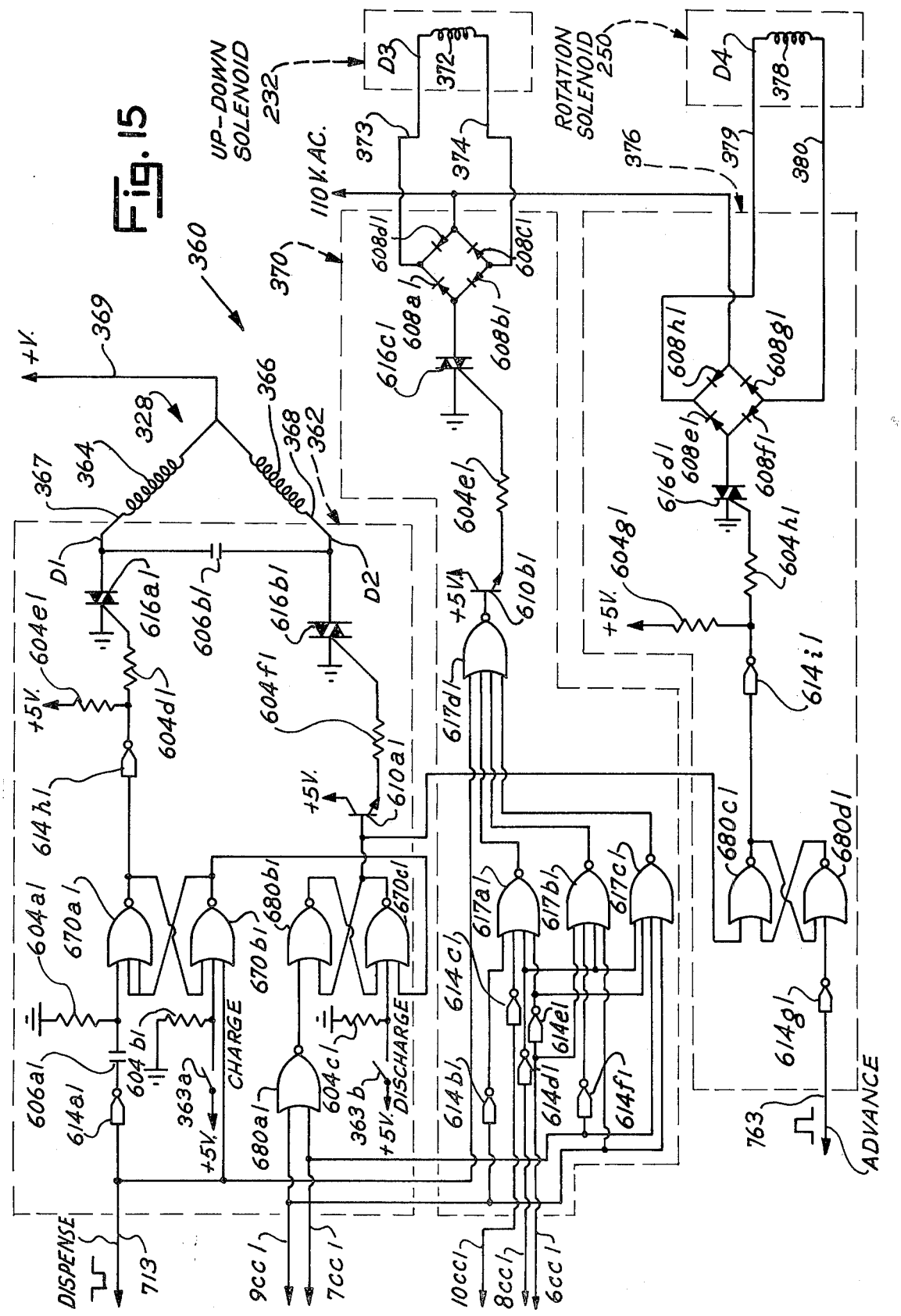

APPARATUS AND METHOD FOR FILLING A COMPARTMENT

RELATED APPLICATION

This is a division of U.S. Application Ser. No. 133,081, filed Apr. 12, 1971, now U.S. Pat. No. 3,748,044, entitled "Digital Chemical Analysis Apparatus" issued July 24, 1973.

BACKGROUND OF THE INVENTION

This invention relates to chemical dispensing techniques, and more particularly relates to method and apparatus for filling a compartment.

In order to rapidly analyze the concentration of a particular substance present in a chemical specimen, such as blood, chemists are placing increasing reliance on various types of machines. Such machines devised in the past may be divided into at least the following types:
1. Blood gas analyzers;
2. Prothrombin time determining systems;
3. Flow systems;
4. Electromechanical methods not related to colorimetry; and
5. Monochromatic servomechanism sytems.

Although such machines have somewhat reduced the labor involved in performing chemical analysis, they have exhibited many deficiencies that have limited their overall usefulness.

For example, technicians have noted the difficulty of loading and cleaning the specimen dispensers and cuvettes of prior art systems. Such difficulties are particularly pronounced when flow-through cuvettes are utilized. These cuvettes provide a single chamber for analyzing multiple specimens that must be purged with a relatively large volume of specimen fluid each time a new specimen is introduced into the chamber. Prior art systems also fail to mix the specimen and reagent with the degree of accuracy desired by most chemists.

According to a principal feature of the present system, applicant provides a unique dispenser that transfers specimens to a cuvette means for holding each of the specimens in an individual compartment. The system drastically reduces the volume of the specimens required for accurate analysis and ensures the purity of the specimens.

DESCRIPTION OF THE DRAWINGS

These and other advantages and features of the present invention will hereinafter appear for purposes of illustration, but not of limitation, in connection with the accompanying drawings, in which like numbers refer to like parts throughout, and in which:

FIG. 7 is an enlarged, top plan view of a valve and a microsyringe shown in FIG. 3;

FIG. 8 is an enlarged, fragmentary, cross-sectional view of the like-numbered encircled portion of FIG. 7;

FIG. 9 is an enlarged schematic diagram of the syringes and valve shown in FIG. 8 during a discharge mode of operation;

FIG. 10 is an enlarged, fragmentary, schematic diagram of the valve shown in FIG. 14 during a charge mode of operation;

FIG. 11 is a fragmentary, side elevational view of a portion of the dispenser assembly shown in FIG. 3;

FIG. 14 is an enlarged, exploded view of a portion of the apparatus shown in FIG. 13;

FIG. 15 is schematic diagram of a preferred circuit used to control the dispenser assembly.

DESCRIPTION OF THE PREFERRED EMBODIMENT

Figure 1:
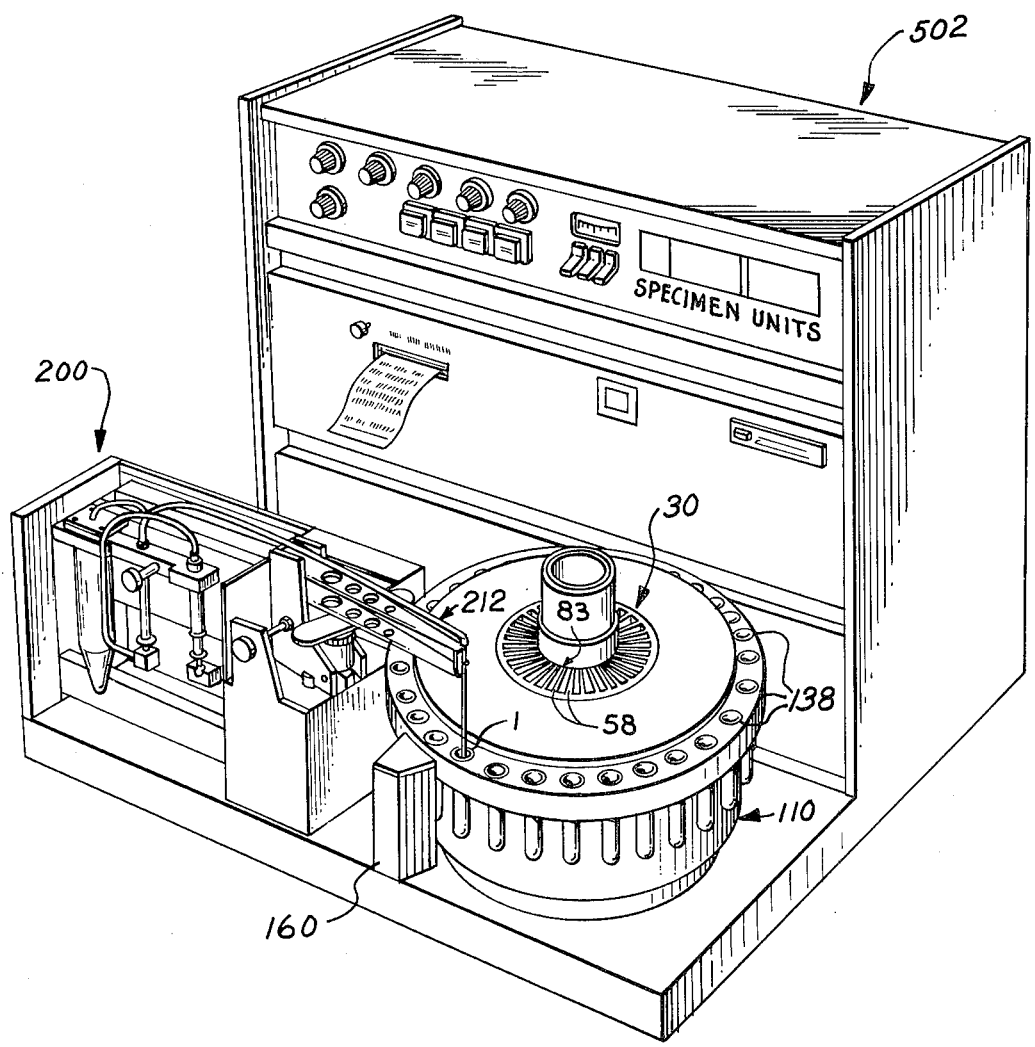
FIG. 1 is a perspective view of a preferred form of apparatus made in accordance with the present invention.

Referring to FIG. 1, a preferred system for analyzing chemical specimens made in accordance with the present invention basically comprises a cuvette assembly 30; a carrousel assembly 110; test tubes 138; a dispenser assembly 200; and a console 502 that includes analyzing apparatus, a processing circuit and a memory.

Figure 2:
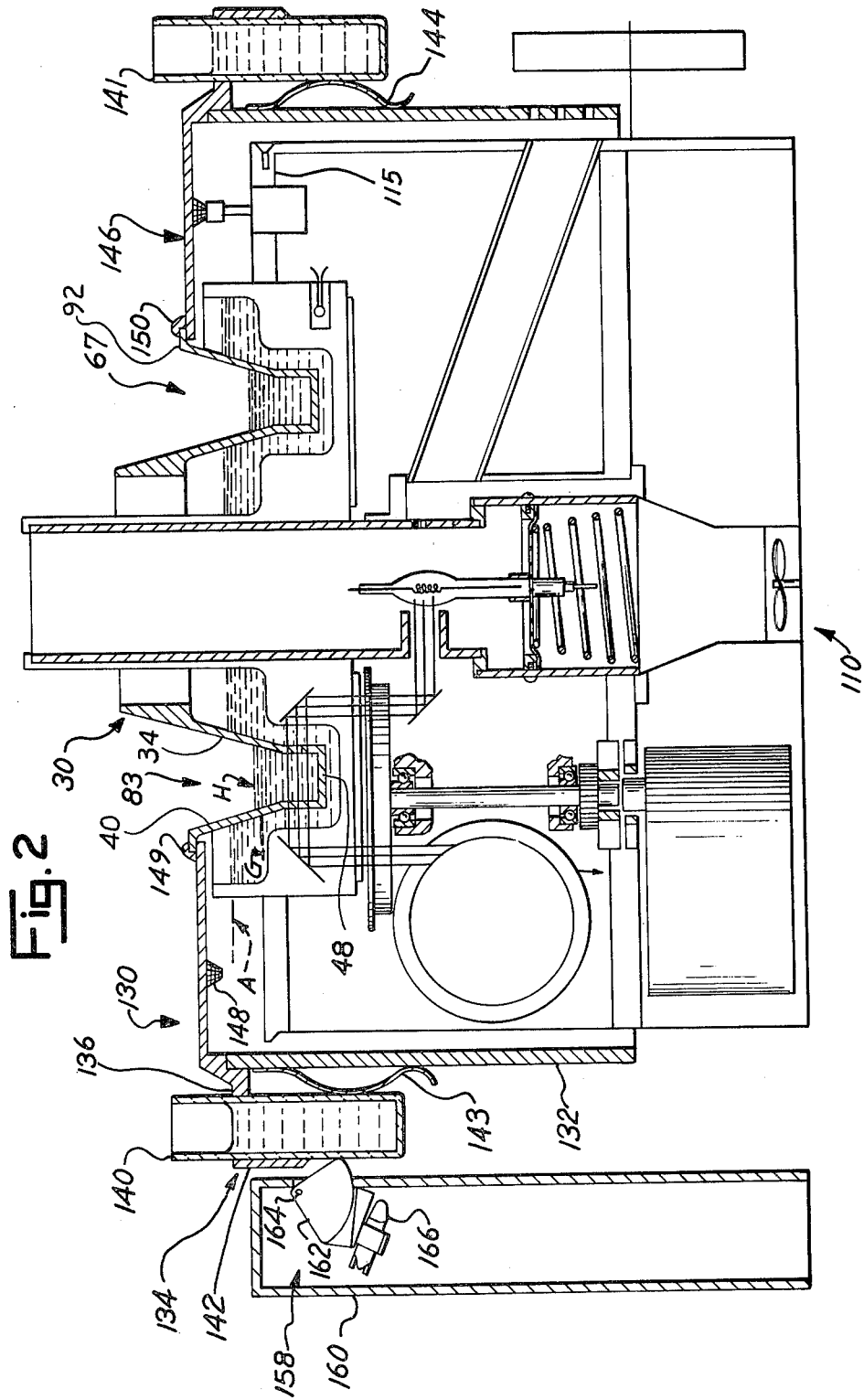
FIG. 2 is a cross-sectional, fragmentary, partially schematic view showing the cuvette assembly, carrousel assembly, cycling apparatus, positioning apparatus, and a portion of the analyzing apparatus of the preferred embodiment.

Referring to FIG. 2, cuvette 30 comprises a plurality of compartments, such as compartments 67 and 83. Compartment 83 comprises sidewalls 34, 40 and a bottomwall 48. Spacers 58 (FIG. 1) are fitted between sidewalls 34 and 40 to enclose the compartment. Compartment 67 is constructed in a similar fashion.

Referring to FIGS. 1 and 2, assembly 110 is provided with a movable positioning platform 130 comprising a cylindrical skirt 132 and a ring-shaped test tube retainer 134. The retainer comprises a horizontal ring member 136 that is provided with holes for receiving 32 test tubes commonly designated by the number 138, and including exemplary test tubes 140, 141. Each of the test tubes lies along a radius common to a corresponding cuvette compartment. The retainer also comprises a vertical ring-shaped retainer 142. According to the preferred embodiment of the invention, the test tubes are used to hold chemical samples prior to the time they are mixed with a suitable reagent to form a specimen for analysis. The tubes are biased against retainer 142 by resilient spring clips, such as exemplary clips 143, 144. The clips are mounted on skirt 132.

Positioning platform 130 also comprises a raised, ring-shaped portion 146 that carries on its underside a circular positioning member 148 bearing detents. Member 148 is provided with one detent opposite each test tube and corresponding cuvette compartment, so that each specimen may be accurately located in a predetermined analyzing position during the analysis procedure. The entire positioning platform is rotatably mounted on platform 115 by means not shown. The inner edges of platform 130 are fitted with guides, such as guides 149, 150, that comate with the notches of a lip 92 of cuvette assembly 30. By using the guides, the cuvette assembly is precisely located on the platform and is rotatable therewith.

As shown in FIG. 2, a test tube detection assembly 158 is held in a cabinet 160 that is located one position ahead of the analyzing position. The assembly comprises a pendulum 162 pivoted around a rod 164. The pendulum normally swings into the path of test tubes 138, and in that position, causes a mercury switch 166 to be closed. When a test tube is positioned opposite assembly 158, pendulum 162 is moved to the position shown in FIG. 2, thereby causing switch 166 to open. Assembly 158 operates in a manner described hereafter so that normal operation of the system is interrupted if no test tube is present at a particular position in ring member 136.

Figure 3:
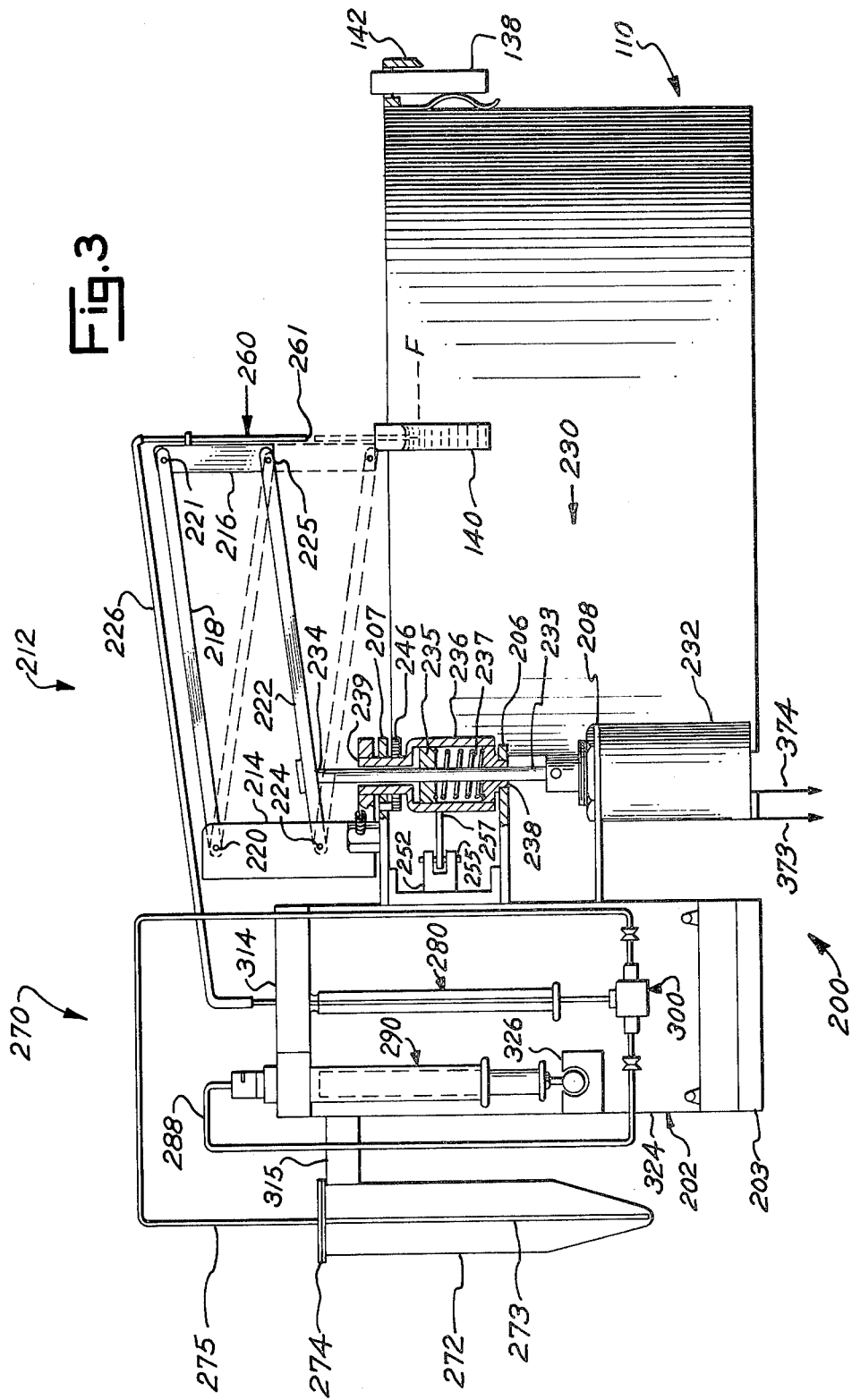
FIG. 3 is a front elevational view of a preferred form of a dispenser assembly made in accordance with the present invention, with the hood and cabinet thereof removed, the probe holding assembly of the dispenser assembly being positioned over a test tube of the carrousel assembly.
Figure 4:
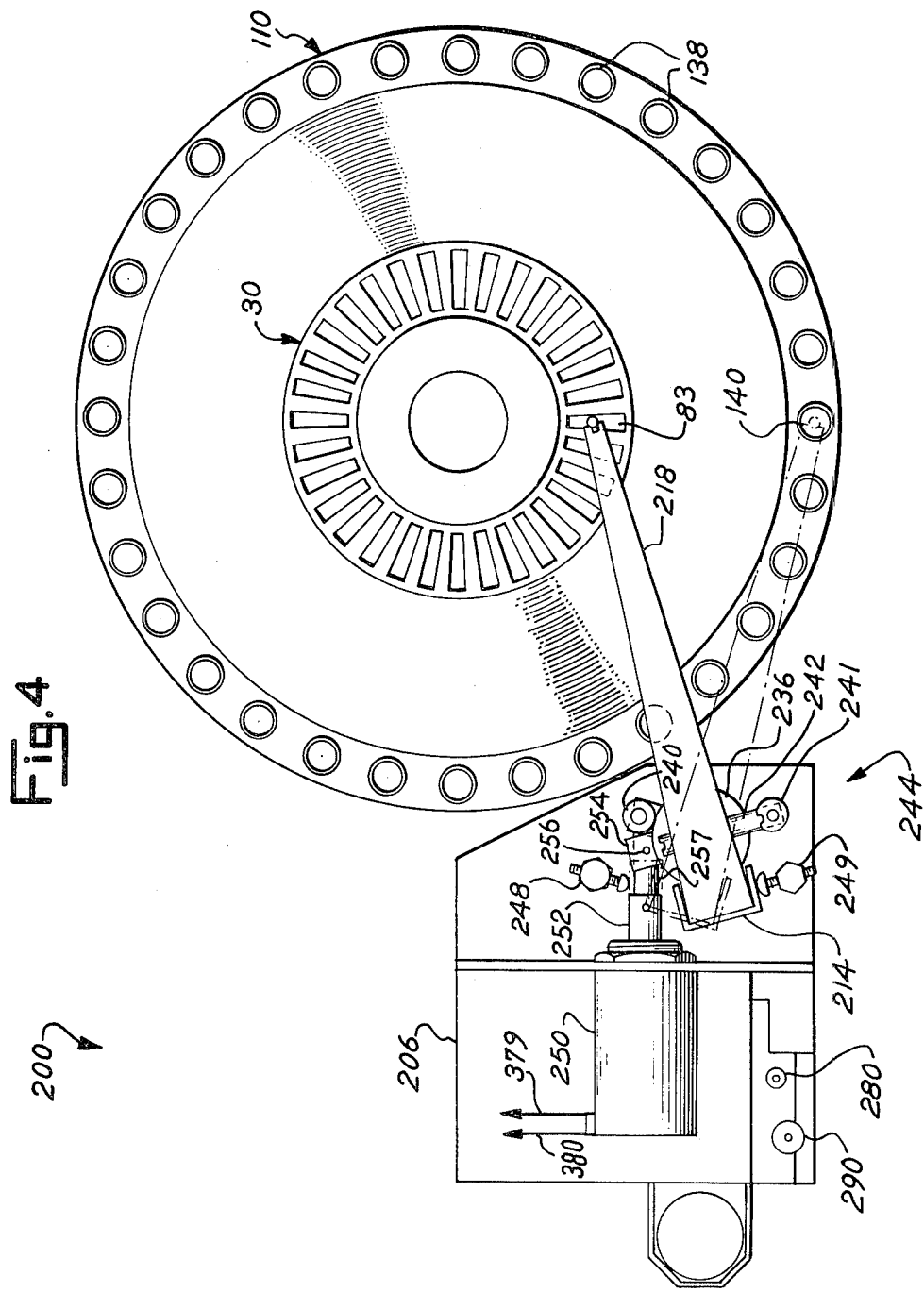
FIG. 4 is a top plan view of the apparatus shown in FIG. 3 in which the probe holding assembly is positioned over the cuvette assembly.

Referring to FIGS. 3 and 4, dispenser assembly 200 comprises a frame 202 that includes a base member 203 and mounting plates 206, 207 and 208.

The dispenser assembly also comprises a probe holding assembly 212 that includes vertical support members 214 and 216. The vertical support members are positioned by an upper arm 218 that is rotatably mounted by pins 220, 221. Likewise, the vertical support members are positioned by a lower arm 222 that is rotatably mounted by pins 224, 225. A tube 226 is used to convey fluid to a probe assembly 260 that is mounted on support member 216.

Dispenser assembly 200 also comprises a vertical positioning assembly 230 that includes an up-down solenoid 232 which operates a push rod 233 having an upper end 234 along its longitudinal axis. Push rod 233 is rigidly connected to a piston 235 that operates in a cylinder 236. The piston is normally biased in an upward direction by a helical bias spring 237 that is held within the cylinder below the piston. As a result, the probe holding assembly is normally positioned in the position shown in solid lines in FIG. 3. (i.e., in the "up" position). Cylinder 236 is rotatably mounted on plate 206 through a lower bearing 238 and is rotatably mounted on plate 207 through an upper bearing 239. Adjustable stop members 240 and 241 cooperate with a bar 242 mounted on the probe holding assembly in order to determine the lowermost position of the probe assembly when it is positioned over the test tubes and cuvette, respectively.

Dispenser assembly 200 also comprises a horizontal positioning assembly 244 that includes a spiral spring 246 having one end connected to plate 207 an the other end connected to cylinder 236. This spring normally biases the probe holding assembly in the position shown in phantom in FIG. 4 (i.e., in the "test tube" position).

Adjustable stops 248 and 249 are used to control the position of the probe holding assembly when it is positioned over the test tubes and the cuvette assembly, respectively. Assembly 244 further comprises a rotation solenoid 250 that operates a push rod 252 along its longitudinal axis. Push rod 252 is connected through pins 255, 256 and arm 257 to a fixture 254 that, in turn, is rigidly affixed to one side of cylinder 236.

Figure 5:
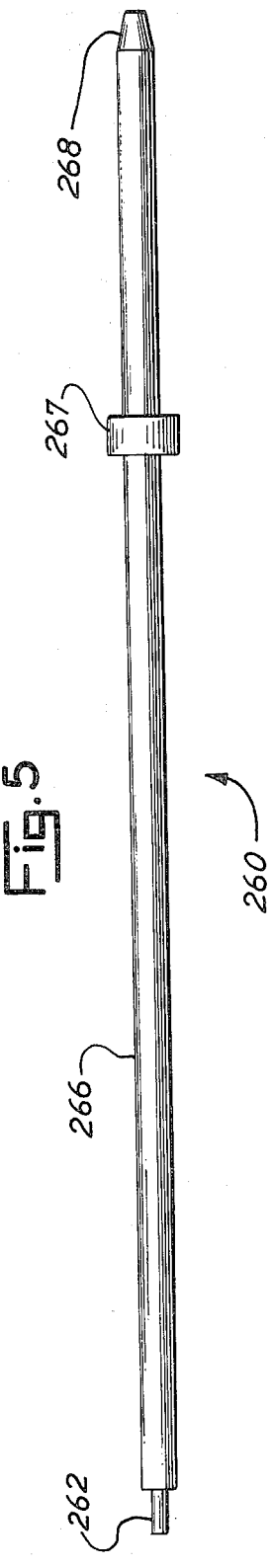
FIG. 5 is a side elevational view of a preferred form of a probe assembly used in connection with the dispenser assembly.
Figure 6:
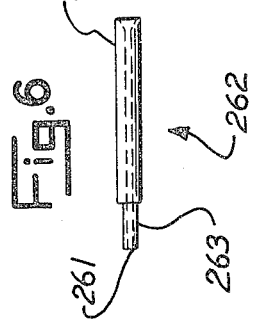
FIG. 6 is an enlarged, side elevational view of a preferred form of a probe nozzle used in connection with the probe assembly.

Referring to FIGS. 5 and 6, the dispenser assembly also comprises a probe assembly 260. The probe assembly comprises a stainless steel nozzle 262 that includes a front barrel 263, a rear barrel 264, and an end point 261. The front barrel has an inside diameter of 0.015 inches and an outside diameter of 0.020 inches. The rear barrel has an inside diameter of 0.015 inches and an outside diameter of 0.032 inches. The total length of the nozzle is 0.39 inches. As shown in FIG. 10, the nozzle is fitted into a tube 266 so that the rear barrel is completely enclosed by the tube. A solder rod 267 is placed over tube 266 in the location shown in order to precisely locate tube 266 in corresponding notch in support arm 216. Tube 266 is terminated in a beveled portion 268 that comates with tube 226 in the manner shown in FIG. 3.

Applicant has discovered that the dimensions of the nozzle are critical for the efficient and accurate dispensing of organic liquids, such as blood serum. More specifically, applicant has discovered that the inside diameter of the nozzle should be between 0.010 inch and 0.020 inch. If the nozzle diameter is substantially less than 0.010 inch, the nozzle tends to clog with any foreign matter that is located in the system. If the inside diameter of the nozzle is substantially greater than 0.020 inch, two problems occur:

1. The velocity of the discharge is not sufficient to cause adequate stirring or mixing of the reagent fluid and blood serum.

2. The meniscus of the fluid at the end point of the nozzle becomes difficult to control. For example, the lower portion of the meniscus might break off, thereby decreasing the accuracy of the amount of fluid transferred.

The outside diameter of the nozzle should be made as small as possible consistent with an appropriate degree of structural strength, thereby reducing the area of the nozzle wetted by the blood serum and holding carry over to a minimum.

The dispenser assembly also comprises a mixing assembly 270. Referring to FIGS. 3 and 7–10, the mixing assembly comprises a reagent reservoir 272 that holds a reagent fluid which is mixed with samples held in test tubes 138 in order to prepare specimens for the various cuvette compartments. The reagent reservoir comprises a dip tube 273, a cover 274, and a transfer tube 275 that is connected with the dip tube.

Referring to FIGS. 7–9, the mixing assembly also comprises a microsyringe 280 having a capacity of 50 microliters. The microsyringe has a glass barrel 281 and a stainless steel tip 282 that define an outer cylinder 283. A hollow plunger 284 defining an inner cylinder 285 is arranged to slide within the outer cylinder 283. Cylinders 283 and 285 together define a cavity 286 having an inlet orifice 287 located at the end of tip 282 and an outlet orifice 288 located at the end of plunger 284. Tip 282 is connected to tube 226, which, together with probe assembly 260 defines a passageway to the probe nozzle tip 261.

Referring to FIG. 9, the mixing assembly also comprises a macrosyringe 290 having a capacity of 2500 microliters. The macrosyringe comprises a stainless steel tip 292 that is fitted into a glass barrel 291 which defines a cylinder 293. A solid glass plunger 294 is adapted to slide within cylinder 293. Cylinder 293 defines a cavity 295 having an inlet orifice 296 at the end of tip 292 that is connected to a tube 298.

Referring to FIGS. 9 and 10, the microsyringe and the macrosyringe are connected to a 3-way valve 300 that comprises a case 301 and a valve element 302. The valve element defines channels 303, 304 that may be interconnected to various inlets 305, 306 and 307. Plunger 284 has its outlet orifice 288 rigidly connected to inlet 306 of valve 300. As shown in FIG. 9, when the valve is in its "discharge" position, it forms a passageway, together with tube 298, that extends from outlet orifice 288 of microsyringe 280 to the inlet orifice 296 of macrosyringe 290. As shown in FIG. 10, when the valve is in its "charge" position, tube 275, together with the valve and tube 298, form a passageway that extends from the reagent reservoir 272 to inlet orifice 296.

Referring to FIGS. 3 and 11–14, the dispenser assembly also comprises an operating assembly 310. The operating assembly comprises a horizontal support bar 314 that rigidly connects barrels 281 and 291 of syringes 280 and 290, respectively to the frame. Another horizontal support bar 315 connects reservoir 272 to the frame. Assembly 310 also includes a removable plate 311 that is connected to valve 300 and to plunger 294 of macrosyringe 290 through a fixture 326. Plate 311 is connected to a carriage 312 by means of screws (not shown). By merely removing these screws, the entire plate assembly shown in FIG. 12 may be removed. This is an important feature since it facilitates the changing of the microsyringe, macrosyringe, and reservoir in order to run different determinations. By removing one plate assembly and substituting another, the apparatus may be changed to accommodate a different determination in a matter of seconds. Plate 311 carries a stop member 313 that may be adjusted by mounting it opposite various multiple holes 313a in plate 311. Member 313 controls the lower position of plate 311 by engaging a microswitch 363a that is attached to the frame through a bracket 319. Plate 311 also carries another stop member 321 that engages another microswitch 363b which controls the upper position of plate 311. Carriage 312 is adapted to move along a vertical shaft 316 that is connected between base plate 203 and horizontal plate 317. The carriage is coupled to shaft 316 through linear bearings 318, 320 that are adapted to slide in a vertical direction along the shaft. The carriage is driven by a rack 322 that cooperates with a pinion gear described hereafter.

Referring to FIGS. 11 and 14, the operating assembly further comprises a clutch assembly 327, that includes an electric motor 328 which has its rotor connected to a clutch plate 330 through a shaft (not shown). The clutch plate operates a valve drive plate 332 having stop facings 333, 334 through a low coefficient clutch facing 336. Drive plate 332 is pinned by means of a hole 342 to a shaft 338 having a slot 339. Stop facings 333, 334 cooperate with stop members connected to the frame which prevent shaft 338 from turning through more than 90° of arc. Slot 339 cooperates with a rib 340 of valve element 302 in order to move the valve element between the discharge and charge positions shown in FIGS. 9 and 10. The clutch plate also operates a pinion drive plate 344 having a slot 345 through a high coefficient clutch facing 346. A pinion gear 348 is connected to the drive plate through a pin (not shown) that fits through a hole 350 into slot 345. This arrangement allows the clutch plate to move through 90° of arc before the pinion gear is moved. The entire clutch assembly is held together by a retaining plate 352, screws 353, springs 354, and nuts 355.

Referring to FIG. 15, the operating assembly also comprises a dispenser control circuit 360. The control circuit basically comprises a motor control circuit 362 having microswitches 363a and 363b that are mounted on the frame adjacent the carriage. Stop members 313 and 321 on the carriage engage the microswitches during the operation of the dispenser. The motor control circuit is used to control windings 364 and 366 that form a part of motor 328. The motor control circuit controls the windings by transmitting signals over conductors 367, 368 and 369.

The dispenser control circuit also comprises an up-down solenoid control circuit 370 that is used to control a winding 372 of up-down solenoid 232 by means of conductors 373, 374. The dispenser control circuit further comprises a rotation solenoid circuit 376 that is used to control a winding 378 of rotation solenoid 250 by means of conductors 379, 380.

The reference numbers in FIG. 15 identify components of the type described in the following Table A:

TABLE A

| Reference Number | Type of Component |
|---|---|
| 604 | resistor |
| 606 | capacitor |
| 608 | diode |
| 609 | solenoid winding |
| 610 | junction transistor |
| 611 | thyristor |
| 612 | field-effect transistor |
| 616 | triac |
| 624 | switch contact |
| 626 | switch wiper |

In FIG. 15, other reference numbers are used to identify components described as follows in Table B:

TABLE B

| Reference Number | Type of Component | Manufacturer | Part or Model No. |
|---|---|---|---|
| 614 | Hex-inverter | Texas Instruments, Inc. | 7404 |
| 670 | NOR gate | Signetics Corp. | 370 |
| 680 | NOR gate | Signetics Corp. | 380 |

In addition, in the FIG. 15, conductors are indicated by numbers from 700–799. Like-numbered conductors are connected together.

The NOR gates shown in the drawings are conventional logic gates that produce one of two voltage levels at their output terminals in response to voltages transmitted to their input terminals. When switched to their one state, the gates produce a relatively high voltage at their output terminals, and when switched to their zero state, the gates produce a relatively low voltage at their output terminals.

A preferred circuit for controlling the operation of the circuit shown in FIG. 15 is described in my related application identified above which is incorporated by reference. Reference is made particularly to FIGS. 31 and 33 of that application which show the interconnection of conductors 6CC1 - 10CC1, 713 and 763 shown in FIG. 15.

DISPENSER ASSEMBLY OPERATION

The operation of the dispenser assembly will now be described assuming that a test tube 140 and its corresponding cuvette compartment 83 are moved into the position shown in FIGS. 3 and 4. It is further assumed that test tube 140 holds an aqueous solution such as blood or the like, and that air has been removed from the mixing assembly.

Figure 16:
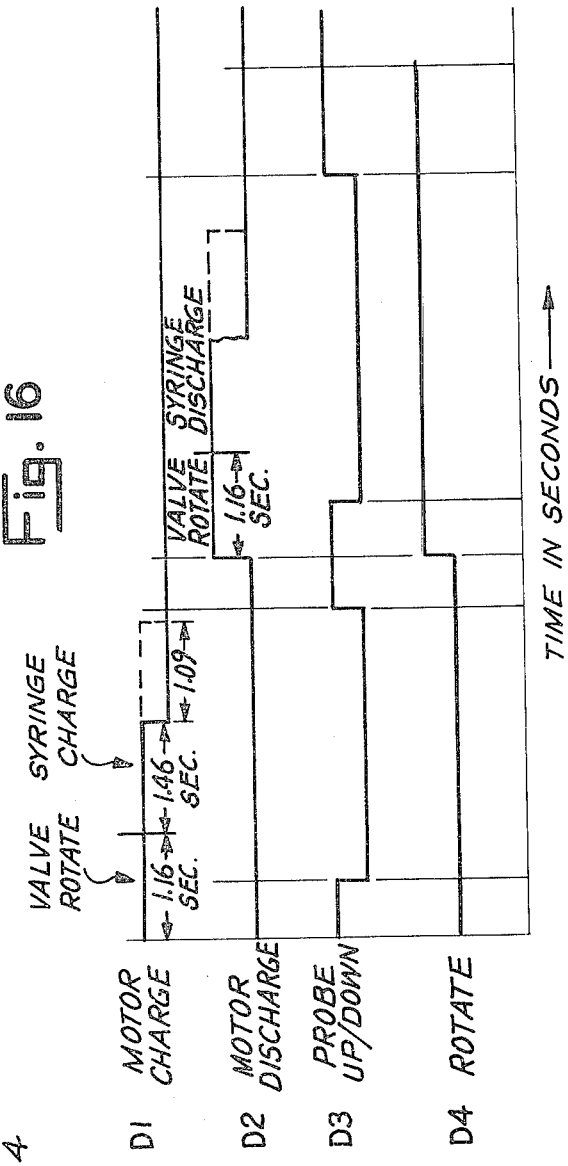
FIG. 16 illustrates certain signal waveforms produced by the circuit shown in FIG. 15.
Figures 12, 13:
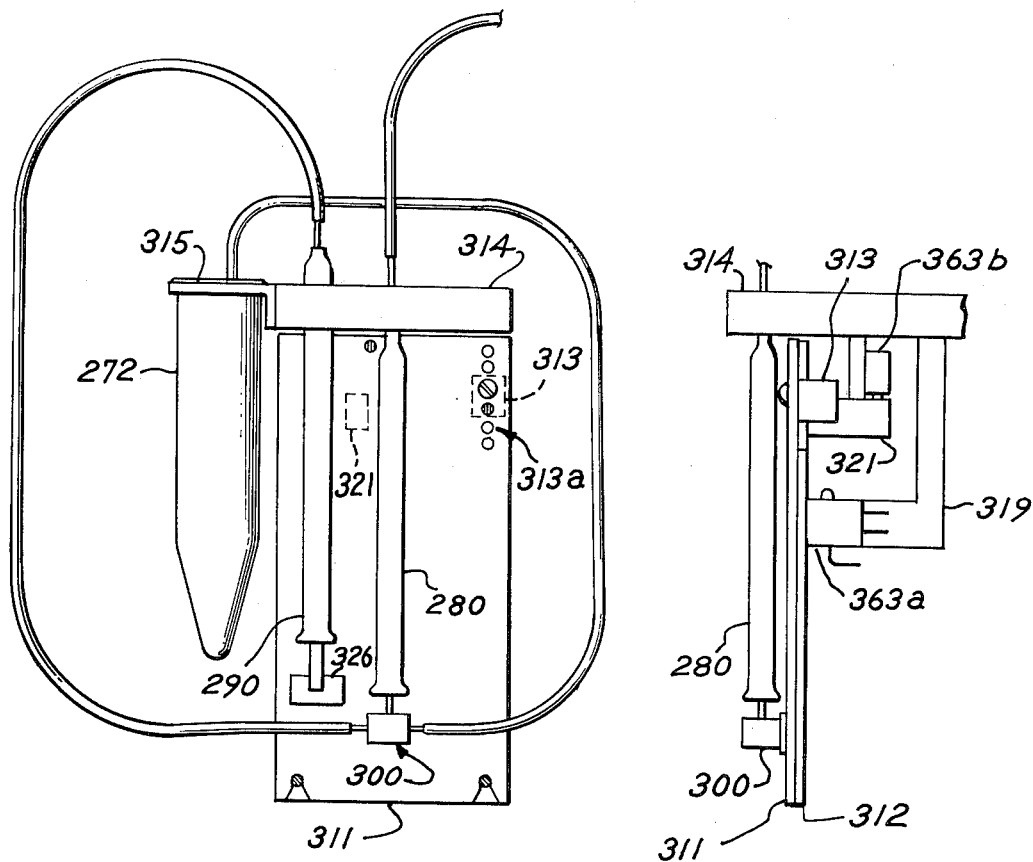
FIG. 12 is a front elevational view of the removable plate of the dispenser assembly, together with the apparatus connected thereto.
FIG. 13 is a fragmentary, side elevational view similar to FIG. 16 and showing additional apparatus used to operate the dispenser assembly.

As previously mentioned, springs 237 and 246 normally bias the probe holding assembly in its up position over the test tubes (i.e., the position shown in solid lines in FIG. 3 and in phantom in FIG. 4). Referring to FIGS. 15 and 16, operation of the dispenser assembly is commenced by the transmission of a negative pulse over the dispense line 713 to the motor control circuit 362. In response to this signal, the motor control circuit produces signal D1 across winding 364 of motor 328 in the manner shown in FIG. 16. In response to signal D1, motor 328 rotates clutch 330, valve drive plate 332, shaft 338, and rib 340 of valve element 302 through 90 degrees of arc so that the valve element is moved to the position shown in FIG. 10. As shown in FIG. 16, the rotation of valve element 302 requires approximately 1.16 seconds.

While valve element 302 is being rotated, up-down solenoid circuit 370 transmits signal D3 (FIG. 16) to winding 372 of up-down solenoid 232. Referring to FIG. 3, in response to the D3 signal, solenoid 232 rapidly lowers push rod 233, thereby lowering end point 261 of probe assembly 260 below the surface of the liquid held in test tube 140 to level F. In other words, the probe holding assembly 212 is lowered to the position shown in phantom in FIG. 3 (i.e., the "charge" position). By properly adjusting stop member 240, end point 261 is located not more than 2 millimeters below the surface of the liquid. Applicant has found that this is an important feature, since it reduces the amount of surface area of the probe nozzle which is in contact with the liquid.

After the probe assembly is in its charge position and after valve element 302 has rotated to the position shown in FIG. 10, the pin inserted in hole 350 of pinion gear 348 (FIG. 14) engages an end of slot 345, thereby causing the pinion gear to rotate. When the pinion gear rotates, it drives rack 322 and carriage 312 in a downward direction (FIG. 11). Since carriage 312 is attached to plunger 294 and valve 300, the plungers of the syringes are pulled away from the syringe barrels, thereby enlarging the cavities defined by the syringes. In this mode of operation, a small amount of fluid is drawn from test tube 140 through end point 261 of the probe assembly into nozzle 262. Normally, the amount of fluid is approximately 10 microliters. At the same time, reagent fluid is drawn from reservoir 272 through tube 275, valve element 302, and tube 298 into the cylinder of syringe 290. In order to achieve the foregoing results, carriage 312 is moved downward approximately ½ inch in approximately 1.46 seconds. When carriage 312 moves downward far enough to engage microswitch 363a (FIG. 15) signal D1 is terminated and the carriage stops. If larger quantities of fluid are to be drawn into the probe assembly, carriage 312 may be moved downward an additional amount, by repositioning stop member 313. After carriage 312 has stopped in its lower position so that plungers 284, 294 have stopped moving, the operating assembly causes nozzle 262 to be retained in the fluid for at least 0.1 second. After the 0.1 second interval has passed, D3 is removed from winding 372 of the up-down solenoid 232 as shown in FIG. 16. At this time, spring 237 rapidly accelerates the probe nozzle away from the liquid in test tube 140 in an upward direction. This is an important feature, since the rapid upward acceleration causes the probe nozzle to break away from the liquid in test tube 140 without retaining a drop of liquid on the nozzle itself. The probe assembly continues to accelerate upward until it attains the position shown in solid lines in FIG. 3.

After the charged probe assembly is in its up position, rotation solenoid circuit 376 causes signal D4 (FIG. 16) to appear across winding 378 of rotation solenoid 250 (FIG. 15.) In response to the signal, solenoid 250 drives push rod 252 toward itself (as shown in FIG. 4) thereby causing the probe holding assembly to move from the position shown in phantom in FIG. 4 to the position shown in solid lines.

At the same time the probe holding assembly is rotating toward the cuvette, motor control circuit 362 causes signal D2 (FIG. 16) to be transmitted through winding 366 of motor 328 (FIG. 15). In response to the signal, the direction of clutch plate 330 is reversed so that valve element 302 is returned to its original position shown in FIG. 13. This operation takes approximately 1.16 seconds.

While the valve element 302 is rotating in the position shown in FIG. 9, up-down solenoid control circuit 370 again impresses signal D3 across winding 372 of the up-down solenoid 232 (FIG. 15). In response to this signal, the end point 261 of the probe assembly is lowered into compartment 83 of the cuvette to level G (FIG. 2). Level G is calculated to be not more than 2 millimeters below the terminal level of liquid which will be in compartment 83 after the probe assembly is discharged. This terminal level is shown as level H in FIG. 2. As previously explained, nozzle end point 261 may be lowered to exactly level G by adjusting stop member 241. This is an important feature, since experience has shown that a liquid bubble will be retained on the probe nozzle if the nozzle end point 261 is not extended slightly below the terminal liquid level. If the nozzle end point remains above this level, a bubble of fluid will be retained on the nozzle, thereby tending to contaminate the next specimen prepared. Likewise, if the nozzle end point extends too far below the terminal level, an excessively large area of the nozzle is wetted, so that an excessive amount of the specimen fluid is carried over to the next compartment.

After valve element 302 has rotated to the position shown in FIG. 9, the pin in hole 350 of the pinion gear 348 engages the opposite end of slot 345, thereby driving rack 322 and carriage 312 in an upward direction as shown in FIG. 11. As a result, plungers 284 and 294 are moved into barrels 281 and 291 of syringes 280 and 290, respectively. This movement reduces the size of the cavities defined by syringes 280 and 290 so that the sample fluid located in probe assembly 260 is expelled into cuvette compartment 83, and the reagent fluid held in cylinder 295 is expelled through tube 298, valve 300, plunger 284, cylinder 283 of microsyringe 289, tube 226, and probe assembly 260 into cuvette compartment 83. The carriage continues to move upward until microswitch 363b is operated by stop member 321, thereby terminating signal D2 and stopping the carriage. The foregoing method of discharge is an important feature, since the reagent fluid is passed through the microsyringe 280, tube 226, and the probe assembly after the fluid sample from the test tube has been expelled into the cuvette compartment. This operation purges these components of the sample fluid, thereby preparing the system to mix another sample with an additional quantity of the reagent fluid. In order to provide adequate purging, the amount of reagent fluid discharged through the probe assembly should be at least 10 times as great as the amount of sample fluid discharged. The proper ratio of reagent to sample fluid is provided by adjusting the relative sizes of the microsyringe and macrosyringe.

The curved bottom and angled sidewalls of cuvette 30 cause the fluid discharged by the probe assembly to be mixed in each cuvette compartment by a swirling action. After the sample and reagent fluids are completely discharged, the resulting specimen in compartment 83 has risen to the level H (FIG. 2) which is 1 to 2 millimeters above the level of end point 261 of the probe nozzle. After carriage 312 has stopped in its upper position, the operating assembly causes nozzle end point 261 to be retained below level H for at least 0.1 second. After this time interval has passed, the up-down solenoid control circuit 370 removes signal D3 from winding 372 of the up-down solenoid 232. In response to the removal of the signal, spring 237 rapidly accelerates the probe assembly upward and away from the specimen fluid in compartment 83. Thereafter, signal D4 is removed from winding 378 of the rotation solenoid 250. In response to the removal of the signal, spring 246 moves the probe holding assembly away from the cuvette to the position shown in phantom in FIG. 4 over the test tubes. At this point, the dispenser assembly is ready for another cycle of operation as soon as another test tube and cuvette compartment are moved into the dispensing position by the cycling assembly.

Those skilled in the art will appreciate that the specific embodiments described herein may be altered and changed by those skilled in the art without departing from the true spirit and scope of the invention which is defined in the appended claims.

I claim:

1. Apparatus for filling a compartment to a predetermined level with an aqueous solution taken from a reservoir of aqueous solution having a surface, said apparatus comprising in combination:
    a hollow probe nozzle having an inside diameter between about 0.010 to 0.020 inches and an end point;
    means for positioning the end point a predetermined distance under the surface of the solution;
    means for drawing a predetermined amount of solution through the end point of the hollow probe nozzle;
    means for retaining the end point under the surface of the solution for a first predetermined period of time after the means for drawing has drawn the predetermined amount of solution through the end point of the probe nozzle;
    means for rapidly accelerating the hollow probe nozzle from the solution;
    means for moving the probe from the vicinity of the reservoir to the vicinity of the compartment;
    means for positioning the end point in the compartment below said predetermined level;
    means for ejecting the predetermined amount of solution from the hollow probe nozzle;
    means for retaining the end point below the predetermined level for a second predetermined period of time after the means for ejecting has ejected the predetermined amount of solution from the hollow probe nozzle; and
    means for rapidly accelerating the hollow probe nozzle from the compartment.

2. Apparatus, as claimed in claim 1, wherein the predetermined distance is not more than two millimeters and the aqueous solution comprises blood serum.

3. A method for filling a compartment to a predetermined level with an aqueous solution taken from a reservoir of aqueous solution having a surface by means of a hollow probe nozzle having an inside diameter of between about 0.010 to 0.020 inches and an end point, said method comprising the steps of:
    positioning the end point not more than two millimeters under the surface of the solution;
    drawing a predetermined amount of solution through the end point of the hollow probe nozzle;
    retaining the end point under the surface of the solution for a first predetermined period of time after the predetermined amount of solution has been drawn through the end point of the hollow probe nozzle;
    rapidly accelerating the hollow probe nozzle from the solution;
    positioning the end point in the compartment at a predetermined level such that the end point is not more than two millimeters below the surface of the solution after the solution is ejected from the hollow probe nozzle into the compartment;
    retaining the end point below the predetermined level for a second predetermined period of time after the predetermined amount of solution has been ejected from the hollow probe nozzle; and
    rapidly accelerating the hollow probe nozzle from the compartment.

4. A method, as claimed in claim 3, wherein the predetermined amount of solution is less than about 0.05 cubic centimeters.

5. A method, as claimed in claim 3, wherein the first predetermined period of time is greater than 0.1 second.

6. A method, as claimed in claim 3, wherein the second predetermined period of time is greater than 0.1 second.

* * * * *